Figure 1:
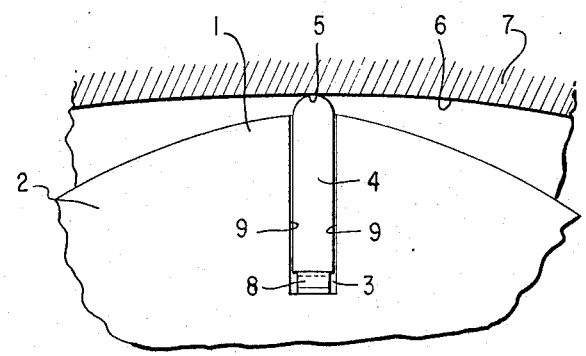

Oct. 25, 1966   W. SPRINGER   3,281,064
SEAL CONSTRUCTION
Filed Dec. 18, 1964

INVENTOR.
WILLI SPRINGER

BY Dicke & Craig
ATTORNEYS.

United States Patent Office 3,281,064
Patented Oct. 25, 1966

3,281,064
SEAL CONSTRUCTION
Willi Springer, Faurndau, Wurttemberg, Germany, assignor to Daimler-Benz Aktiengesellschaft
Filed Dec. 18, 1964, Ser. No. 419,514
Claims priority, application Germany, Dec. 18, 1963, D 43,198
7 Claims. (Cl. 230—145)

The present invention relates to a sealing strip or bar for rotary piston internal combustion engines, especially for such engines as are of trochoidal construction having a polygonal piston, which is provided at each piston corner with a radial seal in the form of a sealing strip or bar disposed in a groove parallel to the axis.

With rotary piston internal combustion engines the sealing bars or vanes are exposed to extraordinarily high loads so that no one succeeded heretofore to so construct the sealing bars or vanes that they satisfy all requirements. The sealing edge of a sealing strip or bar should be extremely wear-resistant by reason of the line contact with the inner casing surfaces of the housing body of the engine and by reason of the high sliding velocities. However, also the lateral surfaces of a sealing strip or bar should be wear-resistant since they are temporarily subjected to high pressures and are pressed against the groove walls in the piston, and since the sealing strip or bar thereby carries out small stroke movements. Furthermore, a sealing strip or bar should also have a small friction value under poor lubricating conditions and additionally should have a slight weight in order to reduce the load by the inwardly directed mass forces on the spring pressing the sealing strip or bar radially outwardly.

It has now been discovered in a surprising manner that the aforementioned requirements can be completely fulfilled by a sealing strip or bar which in accordance with the present invention consists of a ceramic material of high mechanical rigidity and high resistance against temperature changes. Of the known ceramic material having these properties, a highly refractory sintered material having porcelain-like bodies, structures, or textures has proved itself as particularly advantageous which material has a high content of alumina (aluminum oxide $Al_2O_3$) preferably more than 95% of alumina. The ceramic material is appropriately used unglazed and the sealing strip or bar made therefrom is only ground or polished to a very high degree.

The hardness of such a ceramic material is considerably higher than, for example, that of chrome; its specific weight amounts to about half the specific weight of steel and its frictional value even in case of dry friction is very low. Additionally, it is possible to construct sealing bars or strips made of ceramic material with an extraordinarily smooth surface so that the arrangement and accommodation of two sealing bars or strips in a single groove can be advantageously realized.

In the case of a sealing strip which is constructed of a center sealing strip part and of two laterally adjoining sealing strip parts having inclined separating joints, the present invention essentially consists in that the lateral sealing strip parts are made in a conventional manner of metallic material and the center sealing strip part consists of ceramic material of the type described above.

This type of construction is particularly recommendable in those applications in which by reason of the special type of construction of the engine or by reason of the special choice of material for the piston or for the housing of the engine, the linear thermal expansion of a sealing bar consisting completely of ceramic material would not suffice in order to achieve a good lateral seal. Depending on the existing play in front of and to the rear of the sealing strip or bar, the two lateral sealing strip parts can move with respect to the center sealing strip part along the separating joints between these parts.

Accordingly, it is an object of the present invention to provide a radial seal for rotary piston internal combustion engines which obviates by extremely simple means the shortcomings and drawbacks encountered with the prior art constructions.

Another object of the present invention resides in the provision of a radial seal in the form of a sealing bar or vane, exposed to extraordinarily high loads as occur in rotary piston internal combustion engines, which is so constructed as to be able to fulfill all requirements made of the same without involving complicated constructions or special measures.

A further object of the present invention resides in the provision of a sealing bar for the radial seals of rotary piston internal combustion engines which is not only extremely resistant to wear but has a small friction value even under poor lubricating conditions together with a small weight to reduce the loads on the springs normally used to force the radial seals radially outwardly against the inner surfaces of the engine housing.

Another object of the present invention resides in the provision of a radial seal for rotary piston internal combustion engines utilizing sealing bars or vanes that can be constructed with such smooth surfaces that the accommodation of two or more sealing bars or vanes in a single groove may be readily realized.

Still another object of the present invention resides in the provision of a radial seal construction achieving the aforementioned aims and objects while at the same time insuring a good lateral seal by appropriate and sufficient thermal expansion of the parts.

Figure 2:
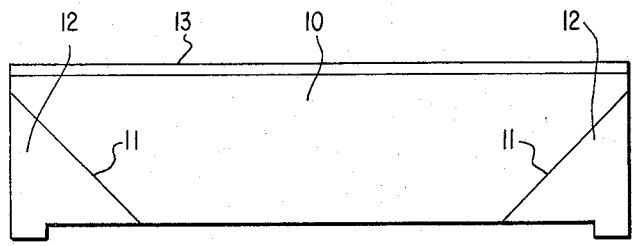

These and further objects, features, and advantages of the present invention will become more obvious from the following description when taken in connection with the accompanying drawing which shows, for purposes of illustration only, one embodiment in accordance with the present invention, and wherein:

FIGURE 1 is a schematic partial cross-sectional view through the piston corner of a rotary piston internal combustion engine provided with a radial seal in accordance with the present invention, and FIGURE 2 is an elevational view of a modified embodiment of a radial seal in accordance with the present invention for use in the piston of FIGURE 1.

Referring now to the drawing and more particularly to FIGURE 1, reference numeral 1 designates in this figure the corner of a polygonal piston 2, shown only in part. The sealing bar or vane 4 is arranged within the groove 3 extending parallelly to the engine axis and provided at the corner 1 of the piston 2. The sealing bar or vane 4 essentially consists of ceramic material of high mechanical rigidity and large resistance against temperature change, for example, of a highly refractory sintered material with porcelain-like bodies, structures, or textures and a high alumina content. If the ceramic material has, for example, an alumina content of about 98%, then the density of the material is about 3.8, the compressibility strength amounts to about 250 kg./mm.$^2$, the elasticity modulus amounts to about 3.8 times $10^4$ kg./mm.$^2$ and the temperature stability goes up to 1,700° Celsius. The porcelain-like bodies, structures, or textures may be of any suitable size and composition as known to a person skilled in the art.

The sealing bar or strip 4 abuts sealingly with the sealing edge 5 thereof against the inner casing surface 6 of the housing body 7 of a rotary piston internal combustion engine of trochoidal construction, otherwise of conventional construction. The spring 8 is disposed within the groove 3 below the sealing bar 4 which spring pushes the sealing bar 4 radially outwardly. Since the ceramic material has a small specific weight, the spring 8 is loaded or stressed relatively little by the mass forces exerted thereon by the bar 4. The hardness of the material produces a very wear-resistant sealing edge 5 and in an analogous manner wear-resistant lateral surfaces 9 which come in contact with the walls of the groove 3. The mirror-like smoothness of the surface attainable by grinding considerably reduces the friction so that in an advantageous manner two sealing strips or bars 4 of ceramic material may be arranged within a groove 3 one behind the other with respect to the direction of rotation of the piston. By reason of the high hardness of the sealing edge 5, the inner casing surface 6 of the housing body 7 made of light metal need not be provided with a separate layer of cam track or runner surface since no danger exists that hard crystals of the material of the housing casing 7 settle in the sealing edge 5.

The smaller thermal expansion co-efficient of a sealing bar of a ceramic material of $6.7 \cdot 10^{-6}$ compared, for example, to the co-efficient of $12 \cdot 10^{-6}$ with special cast iron, enables a smaller lateral assembly play of the sealing strip or bar which, as is known, has a considerable influence on the chamber tightness. As a result thereof, the starting rotational speed of the engine can be considerably reduced.

Whereas the sealing bar 4 according to FIGURE 1 consists of one piece and is constituted completely of ceramic material, the sealing bar or strip illustrated in FIGURE 2 is composed of a center sealing bar portion 10 and of the two adjoining lateral sealing bar portions 12 having inclined separating joints 11. The center bar piece 10 consists of a ceramic material of the type mentioned above and the two lateral sealing bar pieces 12 of metal, for example, of grey cast iron or steel. The separating joints 11 are so laid out that the sealing edge 13 is coordinated in its entire length to the center sealing bar piece 10 of ceramic material.

Optimum tightness can be achieved with the three-partite sealing bar arrangement according to FIGURE 2 because the corner parts made of metal adjust themselves better to the lateral surfaces of the lateral parts of the housing than in case of a unitary bar or vane.

While I have shown and described two embodiments in accordance with the present invention, it is understood that the same is not limited hereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A sealing bar structure for rotary piston internal combustion engines, especially those of trochoidal construction having a polygonal piston provided at each corner with a radial seal disposed in a groove extending substantially parallelly to the engine axis, comprising
    sealing bar means forming each said radial seal and essentially consisting of a ceramic material of high mechanical rigidity and high resistance to temperature change.

2. A sealing bar structure for rotary piston internal combustion engines, especially those of trochoidal construction having a polygonal piston provided at each corner with radial seal disposed in a groove extending substantially parallelly to the engine axis, comprising
    sealing bar means forming each said radial seal and essentially consisting of a ceramic material of high mechanical rigidity and high resistance to temperature change,
    said ceramic material being a highly refractory sintered material with porcelain-like structure and a high content of aluminum oxide.

3. A sealing bar structure for rotary piston internal combustion engines, especially those of trochoidal construction having a polygonal piston provided at each corner with a radial seal disposed in a groove extending substantially parallelly to the engine axis, comprising
    sealing bar means forming each said radial seal and essentially consisting of a ceramic material of high mechanical rigidity and high resistance to temperature change,
    said ceramic material being a highly refractory sintered material with porcelain-like structures and a high content of aluminum oxide,
    the aluminum oxide content being more than 95% by weight.

4. A sealing bar structure for rotary piston internal combustion engines, especially those of trochoidal construction having a polygonal piston provided at each corner with a radial seal disposed in a groove extending substantially parallelly to the engine axis, comprising
    sealing bar means forming each said radial seal and essentially consisting of a ceramic material of high mechanical rigidity and high resistance to temperature change,
    said sealing bar means being unglazed and having very highly ground surfaces.

5. A sealing bar structure for rotary piston internal combustion engines, especially those of trochoidal construction having a polygonal piston provided at each corner with a radial seal disposed in a groove extending substantially parallelly to the engine axis, comprising
    sealing bar means forming each said radial seal and essentially consisting of a ceramic material of high mechanical rigidity and high resistance to temperature change,
    said ceramic material being a highly refractory sintered material with porcelain-like structures and a high content of aluminum oxide,
    the aluminum oxide content being more than 95% by weight,
    said sealing bar means being unglazed and having very highly ground surfaces.

6. A sealing bar assembly for rotary piston internal combustion engines, especially for those of trochoidal construction having a polygonal piston provided at each corner with a radial seal disposed in a groove extending substantially parallelly to the engine axis, comprising
    sealing bar means forming each said radial seal and each including a center portion and two portions lateral of said center portion, said two lateral portions adjoining said center portion along mutually divergently inclined separating joints said lateral portions being of metallic material and the center portion essentially consisting of ceramic material of high mechanical rigidity and high resistance to temperature change.

7. A sealing bar assembly for rotary piston internal combustion engines, especially for those of trochoidal construction having a polygonal piston provided at each corner with a radial seal disposed in a groove extending substantially parallelly to the engine axis, comprising
    sealing bar means forming each said radial seal and each including a center portion and two portions lateral of said center portion, said two lateral portions adjoining said center portion along mutually divergently inclined separating joints, said lateral portions being of metallic material and the center portion essentially consisting of ceramic material of high mechanical rigidity and high resistance to temperature change,
    said ceramic material being a highly refractory sintered material with small porcelain-like structures therein and having a high content of aluminum oxide of at least 95% by weight.

(References on following page)

References Cited by the Examiner

UNITED STATES PATENTS

| | | | |
|---|---|---|---|
| 303,339 | 8/1884 | Temple | 103—216 |
| 3,102,518 | 9/1963 | Anderson | 103—216 |
| 3,128,710 | 4/1964 | Blomgren et al. | 103—126 |
| 3,176,909 | 4/1965 | Maurhoff | 123—8 |

FOREIGN PATENTS

| | | |
|---|---|---|
| 478,780 | 7/1929 | Germany. |
| 802,310 | 2/1951 | Germany. |

MARK NEWMAN, *Primary Examiner.*

WILBUR J. GOODLIN, *Examiner.*